US008718066B2

(12) United States Patent
Dutta et al.

(10) Patent No.: US 8,718,066 B2
(45) Date of Patent: May 6, 2014

(54) FAST HANDOFF USING GPS TECHNOLOGY FOR MOBILE TELEMATICS

(75) Inventors: Ashutosh Dutta, Bridgewater, NJ (US); Wai Chen, Parsippany, NJ (US); Onur Altintas, Florham Park, NJ (US); Sunil Madhani, Edison, NJ (US); Yoshihisa Suwa, Nagoya (JP); Shengwei Cai, Florham Park, NJ (US)

(73) Assignees: Telcordia Technologies, Inc., Piscataway, NJ (US); Toyota Motor Corporation, Aichi-ken (JP)

( * ) Notice: Subject to any disclaimer, the term of this patent is extended or adjusted under 35 U.S.C. 154(b) by 274 days.

(21) Appl. No.: 12/817,427

(22) Filed: Jun. 17, 2010

(65) Prior Publication Data
US 2010/0254350 A1    Oct. 7, 2010

Related U.S. Application Data

(63) Continuation of application No. 10/812,124, filed on Mar. 29, 2004, now Pat. No. 7,768,975.

(51) Int. Cl.
*H04L 12/28* (2006.01)
(52) U.S. Cl.
USPC ............ 370/395.2; 370/395.3; 370/400; 370/411; 370/462
(58) Field of Classification Search
USPC .......... 370/329, 331, 395, 3, 395.31, 395.54; 455/435.1, 436, 437, 438, 439, 440, 455/443, 444, 445, 446
See application file for complete search history.

(56) References Cited

U.S. PATENT DOCUMENTS

| | | | |
|---|---|---|---|
| 6,434,134 B1 | 8/2002 | La Porta et al. | 370/338 |
| 6,625,135 B1 | 9/2003 | Johnson et al. | 370/332 |
| 6,795,709 B2 | 9/2004 | Agrawal et al. | 455/452.1 |
| 6,847,822 B1 | 1/2005 | Dennison et al. | 455/456.1 |
| 7,218,937 B2 | 5/2007 | Peltola et al. | 455/453 |
| 7,224,983 B2 | 5/2007 | Budka et al. | 455/456.1 |
| 2001/0044305 A1 | 11/2001 | Reddy et al. | |
| 2002/0078128 A1 | 6/2002 | Peshkin | 709/201 |
| 2003/0095520 A1* | 5/2003 | Aalbers et al. | 370/338 |
| 2003/0104814 A1 | 6/2003 | Gwon et al. | 455/436 |
| 2003/0125027 A1 | 7/2003 | Gwon et al. | 455/436 |
| 2003/0134648 A1 | 7/2003 | Reed et al. | 455/456 |
| 2004/0085931 A1 | 5/2004 | Rezaiifar | 370/331 |
| 2005/0083887 A1 | 4/2005 | Lee et al. | 370/331 |
| 2005/0138157 A1* | 6/2005 | Jung et al. | 709/223 |
| 2005/0233705 A1 | 10/2005 | Vare et al. | 455/70 |
| 2006/0099952 A1 | 5/2006 | Prehofer | 455/440 |

OTHER PUBLICATIONS

European Search Report, dated Dec. 29, 2008.
Dommety et al.; Fast Handovers for Mobile IPv6 <draft-ietf-mobileip-fast-mipv6-03.txt>; Jul. 2001; p. 9-14.

* cited by examiner

*Primary Examiner* — Alvin Zhu
(74) *Attorney, Agent, or Firm* — Philip J. Feig

(57) ABSTRACT

The present invention relates to the reduction of handoff delays for mobile telematics applications. In particular, the present invention provides a method employing GPS technology to define IP addresses in a mobile environment in order to reduce delays and transient data loss caused by handoff from one network to another.

4 Claims, No Drawings

FAST HANDOFF USING GPS TECHNOLOGY FOR MOBILE TELEMATICS

CROSS-REFERENCE TO RELATED APPLICATIONS

This application is a continuation of pending U.S. patent application Ser. No. 10/812,124, filed Mar. 29, 2004.

FIELD OF THE INVENTION

The present invention relates generally to a method for reducing handoff delays for mobile telematics applications. In particular, the present invention provides a method employing GPS technology to define IP addresses in a mobile environment in order to reduce delays and transient data loss caused by handoff from one network to another.

BACKGROUND

Mobile telematics is a rapidly advancing technology, as more and more users want to be able to gain access and use applications while on the move. For example, IEEE 802.11b wireless LAN, operating at 11 Mb/s, and IEEE 802.11a, operating at 54 Mb/s, have received considerable market acceptance and have proliferated in private and public space. New laptops, notebook computers, and PDA are beginning to have embedded IEEE 802.11 LAN cards and wireless access points may become as ubiquitous as telephone jacks. 3G mobile wireless data service is an emerging technology and WLAN having relatively high-bandwidth capability and low, equipment cost (no spectrum license fee) is being considered as either a competitor or complementary to 3G mobile wireless data service.

However, in order to be useful in the mobile environment, fast handoff between access points belonging to different networks is required. There are several components that contribute to overall handoff delay in a mobile environment. For example, as the mobile user moves from one coverage area to another, a decision must be made whether to connect to a different access point which may result in layer 2 detection delays. Layer 2 detection delays have been largely overcome in some technologies, such as CDMA, that provide soft handoff techniques and beacon interval from an access point will generally account for the delay caused by layer 2 detection. In general, a measure of good performance with respect to level 2 delays is about 100 ms.

Once the layer 2 handoff is complete, the mobile device must determine that it is in a different subnet. This is generally achieved by listening to advertisements from an ICMP router, a foreign agent (FA), or other server. During this process the mobile device must reconfigure itself with a new IP address or foreign agent care-of-address (COA). This also contributes to overall handoff delay and is characterized as IP address discovery phase.

Following reconfiguration of the mobile device and new IP address assignment, further delays can occur, generally characterized as media redirection delays. In particular, depending on the mobility management scheme being used, the mobile device will send a SIP Re-invite, MIP register or MIP update message so that the media will get redirected to the new IP address. Redirection delays can vary depending on the number of signaling messages needed, and the distance between the mobile device and the correspondent host.

While the prior art has considered a variety of ways of reducing overall handoff delay by treating the various components that contribute to the handoff delay, there remains a need in the art for improvements in this area.

SUMMARY

The present invention provides a method for reducing handoff delays associated with IP address discovery and configuration. In particular, by using GPS technology in the definition of IP addresses, the IP address discovery and configuration components of handoff can be done at increased speed, thus reducing overall handoff delays.

DETAILED DESCRIPTION OF THE INVENTION

The present invention provides a method and system for reducing delays during the IP address discovery and configuration process of handoff in mobile environments. In particular, the method and system of the present invention uses GPS technology in the definition of IP addresses to reduce the time it takes for the IP address discovery and reconfiguration process. This in turn leads to a reduction of overall handoff delays and therefore improves mobile telematics applications.

The handoff delay related to IP address discovery and reconfiguration can be broken down into several components. In particular, the time it takes for allocation of the IP address; i.e. the time it takes for the mobile unit to receive the IP address after sending a request, will vary depending on the acquisition method used. It has been observed that obtaining a new IP address using DHCP (Dynamic Host Configuration Protocol) or PPP (Point-to-Point Protocol) can take as long as 30 secs. It has further been observed that by using DRCP (Dynamic Registration and Configuration Protocol), the IP address allocation processing time can be reduced to about 70 msec. Further, reconfiguration or node setup time; i.e. the time it takes to configure the interface once the new IP address has been received by the mobile unit, using DRCP requires additional time. This node setup time has been observed to take about 38 msec. It is noted that DRCP does not offer any methodology for IP address conflict resolution.

A further source of significant delay during IP address discovery and reconfiguration occurs because of the need to carry out an address conflict resolution process to assure that an IP address being sent to the mobile unit is not already in use. Various ARP (Address Resolution Protocol) processes can be used to do this address conflict resolution, but such results in significant delays that have been observed to be as much as 15 secs. For example, proxy-ARP, inverse ARP, reverse ARP, and DHCP ARP are all known mechanisms for providing address conflict resolution.

The delays that occur during IP address discovery, reconfiguration and address conflict resolution can all be reduced in accordance with the present invention, which employs GPS technology, as will be more fully described below.

The present invention provides a system comprising an overlay network having information gateway (IG) components that include functionality that reduces the delays caused by address discovery, reconfiguration and address conflict resolution. In particular, the IGs are connected within the backbone mobile telecommunications network, but are controlled by the service provider wishing to offer a faster handoff service to customers. The information gateways can be considered as access points for the customers, and each IG is equipped with a GPS device that sends both its location and other information to neighboring IGs. Further, each mobile unit that wishes to access the IGs needs to be equipped with a GPS receiver so that the IGs can be informed as to where the mobile unit resides at any particular point in time.

The IGs can each include databases that contain information that will be useful during a handoff. In particular, by virtue of knowing the location of neighboring IGs and the current location of the mobile unit, each IG can determine a list of probable areas that the mobile unit may likely move to, as well as the IG that is located in that area. Once such further IG locations have been determined, the current IG can forward further information to the further IG proactively as the movement becomes imminent. In this way, the GPS information can augment the handoff procedure and overall handoff delays can be reduced. In other words, by starting the process earlier, e.g. before the handoff is actually required, the IP discovery process can be started earlier resulting in less delay.

Further, each IG can include a database of available IP addresses within its location area. This database can be updated regularly by determining what IP addresses other mobile units are using. In this way, the address conflict resolution process can be significantly shortened, as much of the needed information will be available from the IG. In particular, by keeping a dynamic list of the available IP addresses, the IG can nearly eliminate the need for address conflict resolution. It is noted that there remains a need for gathering IP address information from users within the service area that are not mobile users or who are not using the service providers IG network. For example, the IGs may be enabled to receive IP address information from DHCP servers. Alternatively, the IG can run standard ARP processes on IP address in the database to assure there is no address conflict. As a further alternative, the IG may use SNMP monitoring agents such as HP Open-view to extract the ARP cache information from routers in the IGs respective subnet and thus have instantaneous ARP cache information of all the mobile units in the subnet at any particular point of time. In this way the available IP address list can be dynamically maintained by the IGs. Further, a list of the IP addresses in use in a specific zone can be sent over a localized multicast address by the IG. Thus a mobile unit having an impending move to a neighboring coverage area will have the information of IP addresses that are already in use by listening to the localized multicast address. This will also help in speeding up the conflict resolution process.

To take advantage of the reduction in delay on handoff, it is important in the present invention that the mobile unit be able to get the IP address information available from the IG. Therefore, the present invention provides a method wherein the mobile unit discovers a local IG upon boot up. This can be accomplished by either pre-provisioning; e.g. via DHCP server option or DNS "srv" option. In particular, one embodiment of the present invention can be described as follows.

Step 1—Initialization Procedure—During this step the mobile unit configures itself by an available mechanism, e.g. DHCP if in a LAN environment, PPP if in a WAN environment, IPv6 router if using stateless auto-configuration in an IPv6 environment. During this auto configuration, the mobile unit also discovers the locally serving IG and downloads the IP address information from the local IG. In addition, ARP-cache entries from associated routers in the area can be downloaded to help in performing address conflict resolution.

Step 2—New IP address Triggering—The local IG will collect GPS information from the mobile unit and keep track of where the mobile unit is located and heading. When it becomes imminent that the mobile unit is going to move into a new coverage area requiring handoff, the local IG can contact the appropriate neighboring IG and receive available IP addresses within the new coverage area. Because the local IG is in the same area as the mobile unit at the trigger time, little if any delay is experienced in discovering the new IP address. Further, because the IP address information can be dynamically updated at each IG, the need to perform address conflict resolution can be greatly reduced and in some cases eliminated altogether. Further, the IG provides available IP address information from the database to the mobile unit so that configuration of the mobile unit can begin.

The present invention is applicable for movement between any two different subnetworks, even if those subnetworks utilize different underlying technology, such as WLAN, LAN, IPv4 and IPv6 networks. It is not necessary that the service provider have control over the underlying network, but rather, the service provider can simply control the IGs in the overlay network. Each IG may perform like a server and split the connection such that the current session is maintained and a new session is begun only after the mobile unit has moved into a new coverage area and a new IP address has been obtained.

In summary, the present invention provides a system and method which reduces the handoff delay associated with new IP address discovery, configuration and address conflict resolution. By using an IG overlay network in accordance with the present invention, the handoff process can be started proactively before the mobile unit has actually moved into the new coverage area. Further, the IGs can perform the address conflict resolution dynamically and keep a list of available IP addresses, so that they are nearly instantaneously ready when the mobile unit moves into the new coverage area.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A method of storing a list of available IP addresses in a mobile coverage area, said method comprising:
providing an information gateway server having a GPS device and associated with said mobile coverage area, said information gateway server enabled to gather IP address information from mobile and non-mobile devices, and from neighboring information gateway servers in a new coverage area and storage means for storing a list of available IP addresses in said mobile coverage area in accordance with said gathered IP address information and with data from the GPS device; and
dynamically updating said list of available IP addresses maintained by the information gateway server.

2. A method according to claim 1, wherein said step of dynamically updating comprises performing an address conflict resolution process on said available IP addresses.

3. A method according to claim 2, wherein said address conflict resolution process comprises obtaining ARP-cache information from neighboring routers within the mobile coverage area.

4. A method according to claim 3, wherein said ARP-cache information from neighboring routers is obtained using SNMP.

* * * * *